United States Patent [19]

Beasley

[11] Patent Number: 5,542,703
[45] Date of Patent: Aug. 6, 1996

[54] AIR BAG HAVING PANELS WITH DIFFERENT PERMEABILITIES

[75] Inventor: Alonzo W. Beasley, Easley, S.C.

[73] Assignee: JPS Automotive Products Corporation, Greenville, S.C.

[21] Appl. No.: 428,902

[22] Filed: Apr. 24, 1995

Related U.S. Application Data

[62] Division of Ser. No. 259,869, Jun. 15, 1994.

[51] Int. Cl.⁶ .......................... B60R 21/16; B60R 21/28
[52] U.S. Cl. ........................................ 280/739; 280/743.1
[58] Field of Search ................................ 280/739, 743.1, 280/728.1, 738, 743.2

[56] References Cited

U.S. PATENT DOCUMENTS

| | | |
|---|---|---|
| 2,142,728 | 1/1939 | Kienzle ..................... 28/106 |
| 3,333,315 | 8/1967 | Dyer et al. . |
| 3,434,188 | 3/1969 | Summers . |
| 3,451,693 | 6/1969 | Carey . |
| 3,480,547 | 11/1969 | Van Dyk . |
| 3,481,625 | 12/1969 | Chute . |
| 3,494,821 | 2/1970 | Evans . |
| 3,511,519 | 5/1970 | Martin ..................... 280/739 |
| 3,620,903 | 11/1971 | Bunting, Jr. et al. . |
| 3,638,755 | 2/1972 | Sack . |
| 3,705,645 | 12/1972 | Konen . |
| 3,707,746 | 1/1973 | Summers . |
| 3,730,551 | 5/1973 | Sack et al. . |
| 3,799,574 | 3/1974 | Bonn et al. . |
| 3,807,754 | 4/1974 | Rodenbach et al. . |
| 3,879,056 | 4/1975 | Kawashima et al. . |
| 3,879,057 | 4/1975 | Kawashima et al. . |
| 3,888,504 | 6/1975 | Bonn et al. . |
| 3,892,425 | 7/1975 | Sakairi et al. . |
| 3,937,488 | 2/1976 | Wilson et al. . |
| 4,031,283 | 6/1977 | Fagan . |
| 4,324,574 | 4/1982 | Fagan . |
| 4,543,113 | 9/1985 | Forester et al. . |
| 4,569,088 | 2/1986 | Frankenburg et al. . |
| 4,673,616 | 6/1987 | Goodwin . |
| 4,828,914 | 5/1989 | Caldwell . |
| 4,872,276 | 10/1989 | Godfrey . |
| 4,898,761 | 2/1990 | Dunaway et al. . |
| 4,921,735 | 5/1990 | Bloch . |
| 4,932,107 | 6/1990 | Gotoh et al. . |
| 4,959,894 | 10/1990 | Jeffers et al. . |
| 4,963,412 | 10/1990 | Kokeguchi . |
| 4,967,456 | 11/1990 | Sternlieb et al. . |
| 4,977,016 | 12/1990 | Thornton et al. . |
| 5,010,663 | 4/1991 | Thornton et al. . |
| 5,018,761 | 5/1991 | Henseler . |
| 5,073,418 | 12/1991 | Thornton et al. ..................... 280/743.1 |
| 5,093,163 | 3/1992 | Krummheuer et al. . |
| 5,098,125 | 3/1992 | Thornton et al. . |
| 5,114,180 | 5/1992 | Kami et al. ..................... 280/739 |
| 5,136,761 | 8/1992 | Sternlieb et al. . |
| 5,193,847 | 3/1993 | Nakayama ..................... 280/739 |
| 5,213,361 | 5/1993 | Satoh et al. . |
| 5,215,795 | 6/1993 | Matsumoto et al. ............. 280/728.1 |

(List continued on next page.)

FOREIGN PATENT DOCUMENTS

| | | |
|---|---|---|
| 00974745 | 9/1975 | Canada . |
| 1025013 | 1/1978 | Canada ..................... 280/743.1 |
| 0193078A1 | 9/1986 | European Pat. Off. . |
| 0286246A2 | 10/1988 | European Pat. Off. . |
| 0452163A1 | 10/1990 | European Pat. Off. . |
| 64-41438 | 2/1989 | Japan . |
| 2265122 | 9/1993 | United Kingdom ............ 280/739 |

Primary Examiner—Eric D. Culbreth
Assistant Examiner—Peter C. English
Attorney, Agent, or Firm—Dority & Manning

[57] ABSTRACT

A vehicle air bag including a first panel of calendered uncoated fabric with a permeability of less than approximately 2 CFM at a pressure drop of 0.5 inches of water and at least one second panel of calendered uncoated fabric of the same yarn and weave type as the first panel operatively associated with the first panel. The at least one second panel has a permeability of greater than approximately 2 CFM at a pressure drop of 0.5 inches of water. At least one of the panels is constructed of a fabric having been processed to a controlled higher permeability subsequent to calendering.

12 Claims, 4 Drawing Sheets

U.S. PATENT DOCUMENTS

| | | |
|---|---|---|
| 5,246,250 | 9/1993 | Wolanin et al. |
| 5,252,386 | 10/1993 | Hughes et al. |
| 5,277,239 | 1/1994 | Sollars, Jr. |
| 5,296,278 | 3/1994 | Nishimura et al. |
| 5,302,432 | 4/1994 | Shigeta et al. |
| 5,313,434 | 7/1992 | Krummheuer et al. |
| 5,356,680 | 10/1994 | Krummheuer et al. |
| 5,375,878 | 12/1994 | Ellerbrok ............................ 280/743.1 |

AIR BAG HAVING PANELS WITH DIFFERENT PERMEABILITIES

This is a division of application Ser. No. 08/259,869, filed Jun. 15, 1994, pending.

BACKGROUND OF THE INVENTION

The present invention relates generally to air bags of the type utilized in vehicle occupant restraint systems. More particularly, the present invention relates to a vehicle air bag constructed substantially entirely of an uncoated fabric, as well as methods of producing such an air bag.

Virtually all motor vehicles in service today are equipped with seatbelts to restrain vehicle occupants during a collision. Recently, however, many vehicles have also been equipped with air bag systems to supplement the protection provided by seatbelts. These air bag systems utilize at least one folded air bag in fluid communication with a source of inflation gas. A sensor is provided to detect a collision between the vehicle and another object. When such a collision is detected, the sensor actuates the source of inflation gas. As a result, the air bag is rapidly expanded to absorb at least a portion of the impact force which would otherwise have been imparted to the vehicle occupant.

Typically, the air bag is designed to inflate in a period which generally corresponds to the "crash pulse" of the vehicle in which it is installed. For example, a vehicle having relatively "stiff" frame may have a crash pulse of approximately 30 milliseconds. In other words, a period of 30 milliseconds will elapse between the time in which a collision occurs at the front end of the vehicle and the time in which the force of such a collision is transmitted back to the vehicle occupant and the cushion is fully inflated.

In contrast, a vehicle having a relatively "soft" frame may have a crash pulse of approximately 50 milliseconds or more. Thus, an air bag installed in an exemplary vehicle having a relatively "stiff" frame may be required to inflate 20 milliseconds or more faster than an air bag installed in an exemplary vehicle have a relatively "soft" frame. To effect this faster inflation, a larger and more powerful source of inflation gas will typically be required.

Air bags have generally been divided into two types, i.e. driver side and passenger side. Driver side air bags have often been fitted into the vehicle steering column. These air bags, which typically have a circular configuration when fully inflated, have tended to be smaller because of the relatively small space between the driver and the steering wheel.

Passenger side air bags, on the other hand, have generally been fitted into the vehicle dash ahead of the front seat passenger. Due to the relatively large space between the front seat passenger and the dash, these air bags have tended to be larger than driver side air bags. When fully inflated, a passenger side air bag will generally have a box-like configuration.

Due to various considerations, driver side air bags and passenger side air bags have often been constructed of different materials. Specifically, driver side air bags have frequently been constructed of a base fabric of either nylon or polyester which has been coated with chloroprene (neoprene), silicone or other appropriate elastomeric resin to reduce permeability. Passenger side air bags have generally been constructed of uncoated fabric.

It is important to design an air bag such that a specific rate of deflation is achieved. In other words, the air bag should quickly deflate in a controlled manner as it is impacted by the vehicle occupant. Adequate support will thereby be provided to the vehicle occupant without excessive rebounding.

To achieve the desired rate of the deflation, driver side air bags have generally been constructed having relatively large vent holes through which the inflation gas is expelled. It should be appreciated that an air bag intended to be used in a vehicle having a stiff frame will generally be required to deflate faster than an air bag for use in a soft frame vehicle. Thus, the specific size of these vent holes will generally be related to the crash pulse of the vehicle.

Because the inflation gas is generally very hot, the vent holes have typically been defined in the rear panel of the air bag opposite the front panel which is impacted by the driver. While face burns are largely avoided by placing the vent holes in this location, finger and hand burns have often occurred. Additionally, relatively large vent holes often allow sodium azide particulate in the inflation gas to escape into the vehicle's passenger compartment.

Due to these problems, the air bag industry has developed various alternative designs which do not have large vent holes. One such design is referred to as a "hybrid" air bag. The hybrid air bag is a driver side air bag utilizing a coated front panel which is generally impermeable to air, while having a back panel constructed of an uncoated fabric. This uncoated fabric, like the uncoated fabric utilized to produce many passenger side air bags, provides a degree of air permeability by venting air through the fabric's natural interstices.

Prior art uncoated fabrics utilized in vehicle air bags rely heavily on processing parameters to control air permeability. For example, different air permeability values have often been achieved by adjusting such factors as yarn preparation, weaving, scouring or heat setting. A problem with attempting to achieve a specific air permeability in this manner is that such processing parameters are often difficult to control on a consistent basis. As a result, relatively large variations in air permeability are often seen between respective lots of uncoated fabric which have ostensibly been prepared to the same permeability specification. In fact, variations of +/− three (3) cubic feet per minute (CFM) at ½ inch of water pressure are not uncommon. These wide variations in permeability may undesirably result in large variations in the deflation rates of respective air bags produced for a particular vehicle model.

SUMMARY OF THE INVENTION

The present invention recognizes and addresses the foregoing disadvantages, and others of prior art constructions and methods.

Accordingly, it is an object of the present invention to provide an improved air bag for use in a motor vehicle.

It is a more particular object of the present invention to provide an improved vehicle air bag which is constructed substantially entirely of an uncoated fabric.

It is a further object of the present invention to provide an improved vehicle air bag constructed substantially of an uncoated fabric which has multiple panels of various permeabilities.

It is also an object of the present invention to provide an improved fabric material for use in an air bag.

It is an additional object of the present invention to provide improved methods of producing a vehicle air bag.

Some of these objects are achieved by a vehicle air bag for use with an on-board inflator mechanism. When constructed as a driver side air bag, it may include a front panel of substantially uncoated fabric having a permeability of less than approximately two (2) CFM. A back panel of uncoated fabric is also provided having a permeability of greater than approximately two (2) CFM. In presently preferred embodiments, the back panel will have a permeability falling within a range of approximately four (4) CFM to six (6) CFM. (Unless otherwise indicated, permeability values given herein are expressed with reference to a pressure drop of ½ inch of water.) With the exception of a hole defined therein for providing fluid communication with the on-board inflator mechanism, the back panel is substantially continuous throughout its extent.

The air bag may also be constructed as a passenger side air bag further having a body panel and a pair of side panels. In this case, the body panel will preferably have a permeability of less than approximately two (2) CFM, whereas the side panels will preferably each have a permeability of greater than approximately five (5) CFM. Preferably, the permeability of the side panels will fall within a range of approximately five (5) CFM to seven (7) CFM.

Controlled permeability in the various panels may be achieved according to the invention by a multiplicity of needle punctures having a larger diameter at a first side of the fabric than at a second side of the fabric. In this case, the fabric of the front or body panels may be arranged such that the first side defines a portion of an exterior of the air bag. Conversely, the fabric of the back and side panels may be arranged such that the first side defines a portion of an interior of the air bag.

Some objects of the present invention are also achieved by a method of producing a vehicle air bag constructed substantially entirely of an uncoated fabric. Preferably, a first step in such a method is to provide an uncoated fabric of appropriate synthetic yarn. A first portion of the uncoated fabric may then be selectively processed to achieve a first preselected permeability. Next, a second portion of the uncoated fabric may also be selectively processed to achieve a second preselected permeability which is higher than the first preselected permeability. The vehicle air bag may then be constructed utilizing the first portion and second portion of the uncoated fabric for various panels thereof.

In a presently preferred methodology, the first and second portions of the uncoated fabric are selectively processed by being calendered under selected temperature and pressure conditions to achieve a low reference permeability. The portions are then further processed to increase a porosity thereof such that a selected permeability is achieved on a consistent basis. In the case of a front panel of a driver side air bag or a body panel of a passenger side air bag, this controlled permeability would generally be less than two (2) CFM. For a back panel of a driver side air bag this controlled permeability would generally be greater than approximately two (2) CFM, whereas a controlled permeability of greater than five (5) CFM would generally be selected for side panels of a passenger side air bag.

This further processing may be accomplished by moving the uncoated fabric at a selected speed past a plurality of needles reciprocating at a selected rate into and out of engagement therewith. In this case, a plurality of barbless needles are preferably utilized if the preselected permeability is less than a threshold permeability. If the preselected permeability is greater than the threshold permeability, a plurality of barbed needles are preferably utilized for this purpose. The threshold permeability may generally fall within a range of 3.0 CFM to 4.0 CFM, with a value of approximately 3.5 CFM being typical.

Alternatively, the uncoated fabric may be moved past a plurality of fluid jets, preferably water jets, which impact the uncoated fabric under selected operating conditions. Pores created by the fluid jets may be set in the uncoated fabric by heat. As a result, the fabric will maintain the desired permeability level during use.

Other object, features and aspects of the present invention are discussed in greater detail below.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying figures, in which.

Figure 1:
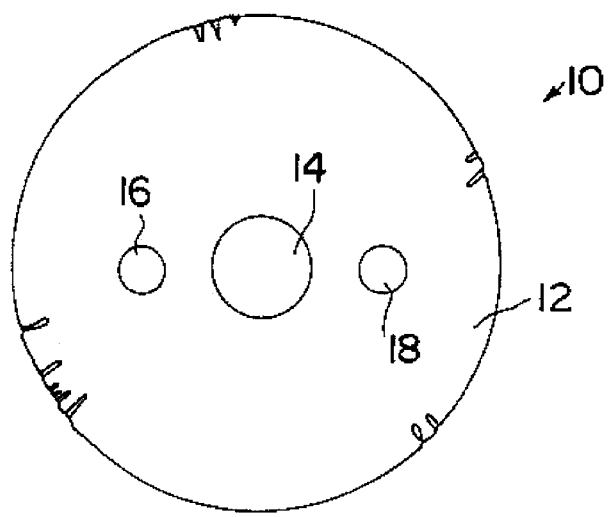
FIG. 1 is a back elevation of a typical prior art driver side air bag.

Repeat use of reference characters in the present specification and drawings is intended to represent same or analogous features or elements of the invention.

DETAILED DESCRIPTION OF THE PREFERRED EMBODIMENTS

It is to be understood by one of ordinary skill in the art that the present discussion is a description of exemplary embodiments only, and is not intended as limiting the broader aspects of the present invention, which broader aspects are embodied in the exemplary construction.

Referring now to FIG. 1, a typical driver side air bag of the prior art is indicated generally at 10. Air bag 10 includes a front panel (not shown) which is attached to a back panel 12 via stitching or other appropriate means of such attachment. Back panel 12 defines an inflator hole 14 to provide fluid communication with a source of inflation gas. As discussed above, the front panel and back panel 12 are each typically constructed of fabric which has been coated with an elastomeric resin to be practically impermeable to the passage of air. Accordingly, vent holes, such as vent holes 16 and 18, are defined in back panel 12 to expel the inflation gas so that air bag 10 will quickly deflate as desired.

As described above, the use of vent holes has often produced a number of undesirable consequences, such as finger or hand burns and excessive gas particulate. Additionally, air bags constructed of coated material tend to be more bulky than air bags constructed of uncoated material. Coated material is also generally more expensive to produce than uncoated material. As used herein, it is to be understood that the term "coated" refers to the coating of a fabric with some type of elastomer or the like to reduce its air permeability. Thus, the term "uncoated" is not intended to preclude coating of the fabric with some other type of material having a relatively small weight in comparison with the base fabric for purposes other than reducing air permeability.

Figure 2:
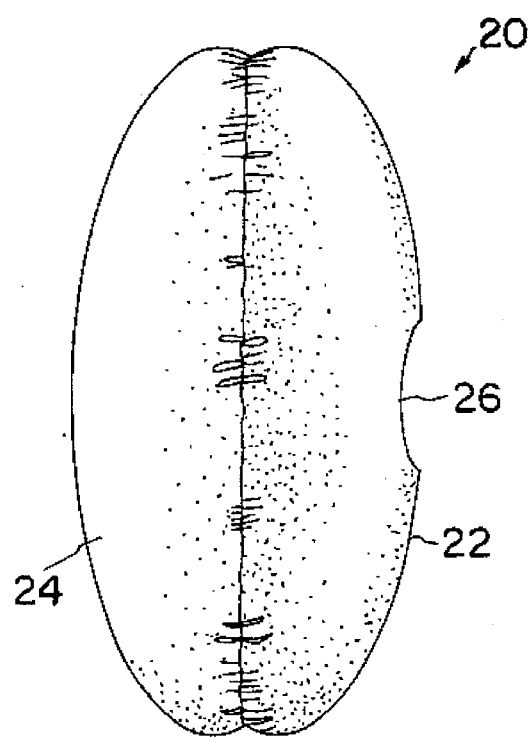
FIG. 2 is a side elevation of a driver side air bag constructed in accordance with the present invention.

FIG. 2 illustrates a driver side air bag 20 of the present invention which is constructed substantially entirely of uncoated fabric. Air bag 20 has a back panel 22 and a front panel 24 attached about their respective circumferences by stitching or other appropriate means of such attachment. Back panel 22 defines therein an inflator hole 26, but preferably is otherwise continuous throughout its extent. In other words, back panel 22 may be generally devoid of large vent holes, such as vent holes 16 and 18 of air bag 10.

Instead of relying upon the natural interstices of the fabric to provide venting, the uncoated fabric of back panel 22 and front panel 24 has been processed according to the invention to provide a controlled permeability. As indicated by the relative occurrence of stippling in FIG. 2, back panel 22 will preferably have a greater permeability than front panel 24. In presently preferred embodiments, the permeability of back panel 22 is greater than approximately two (2) CFM, often falling within a range of approximately four (4) CFM to six (6) CFM. In an exemplary construction, the permeability of back panel 22 may fall within a range of five (5) CFM to six (6) CFM. Front panel 24 will generally have a permeability of less than two (2) CFM.

Figure 3:
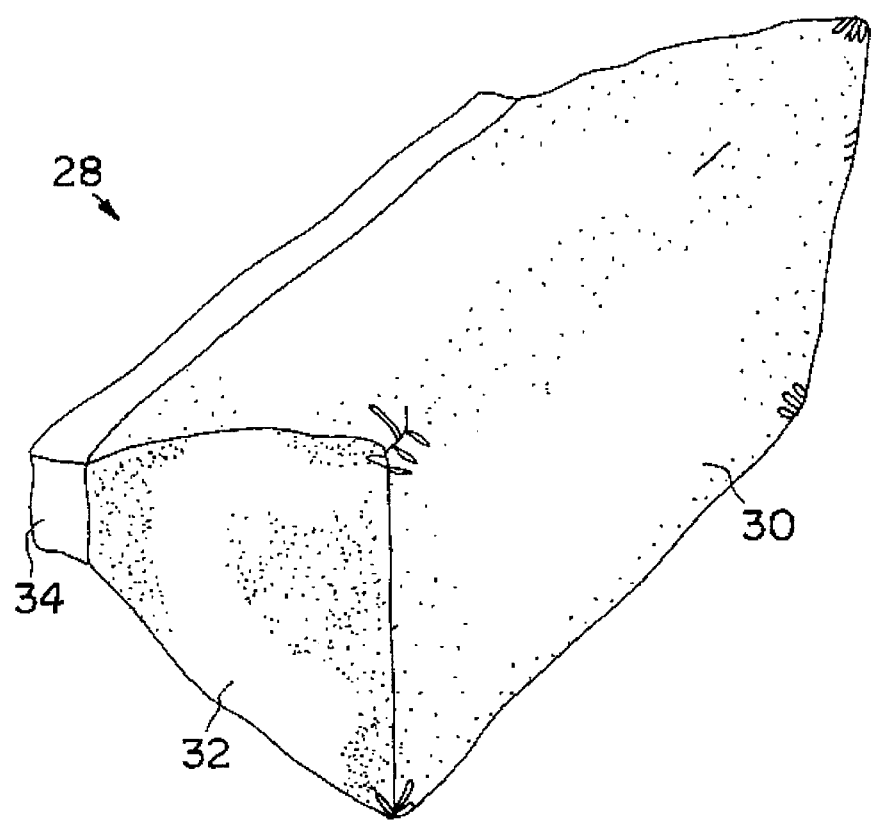
FIG. 3 is a perspective view of a passenger side air bag constructed in accordance with the present invention.

FIG. 3 illustrates a passenger side air bag 28 of the present invention. Air bag 28 is also constructed substantially entirely of uncoated fabric, which has not been uncommon in passenger side air bags of the prior art. Air bag 28 differs from the prior art, however, in that respective panels thereof are produced according to the invention to have a controlled permeability. As a result, greater consistency in deflation may be achieved.

A body panel 30 forms a top, front and bottom portion of air bag 28. Preferably, body panel 30 has a permeability of less than two (2) CFM. A left side panel 32 and a similar right side panel (not shown) are stitched or otherwise attached to body panel 30. The controlled permeability of such side panels is preferably greater than five (5) CFM, and may generally fall within a range of approximately five (5) CFM to seven (7) CFM. Air bag 28 further includes a snout assembly 34 to provide fluid communication with the source of inflation gas.

Presently preferred methods by which controlled permeability may be achieved in the fabric utilized in air bags 20 and 28 may be best understood with reference to FIGS. 4 through 8. According to at least one exemplary technique, an important step in providing this controlled permeability is to stabilize the permeability of the fabric at a low reference permeability. Once this low reference permeability is achieved, further processing may be utilized to selectively increase fabric porosity. The amount and character of such further processing will then determine the final permeability of the fabric.

Figure 4:
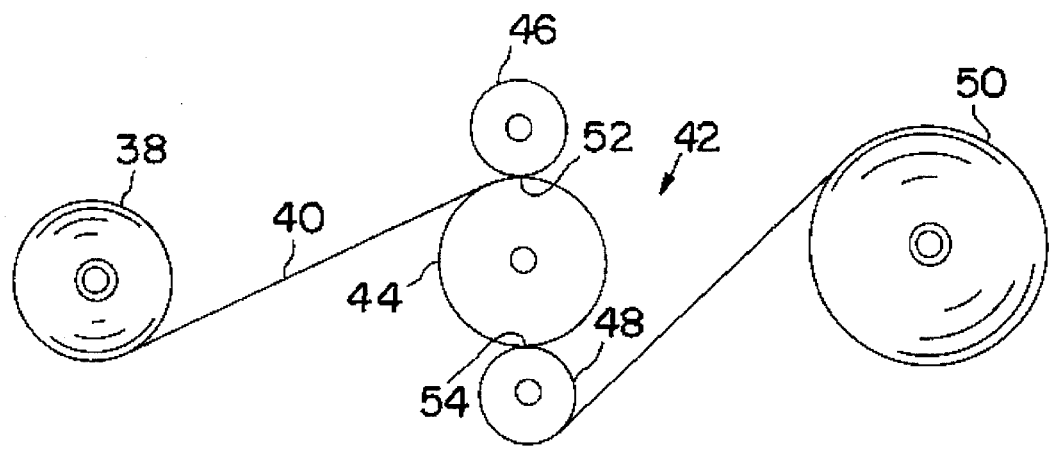
FIG. 4 diagrammatically illustrates calendering of an uncoated fabric to selectively reduce the permeability thereof.

The low reference permeability is preferably achieved by calendering, as illustrated in FIG. 4. In this regard, a supply roll 38 provides uncoated fabric 40 of the type which is appropriate for use in an air bag. A number of specifications for air bag fabric are well known, including weight, thickness and strength. Preferably, the fabric of supply roll 38 will be either woven or warp knitted fabric constructed substantially entirely of synthetic fibers. Because nylon is somewhat hygroscopic, i.e. water absorbing, presently preferred embodiments may frequently utilize polyester yarn. Such yarn may have a size of 600 denier or other yarn size appropriate for the exigencies of a particular application.

Fabric 40 is delivered from supply roll 38 into a calender device 42, which includes a relatively large center roller 44 and a pair of smaller rollers 46 and 48. As shown, fabric 40 extends between rollers 44 and 46 and then around roller 48. After leaving calender device 42, fabric 40 is delivered to take up roll 50 as illustrated.

Rollers 46 and 48 apply heat and pressure onto contiguous portions of center roller 44. As a result, fabric 40 is calendered on one side at two nip locations 52 and 54. It has been found that calendering fabric 40 at a temperature of 300 degrees Fahrenheit and a pressure of 3000 lbs. per square inch produces a reference permeability of less than one (1) CFM, as is generally desired according to presently preferred methodology.

Figure 5:
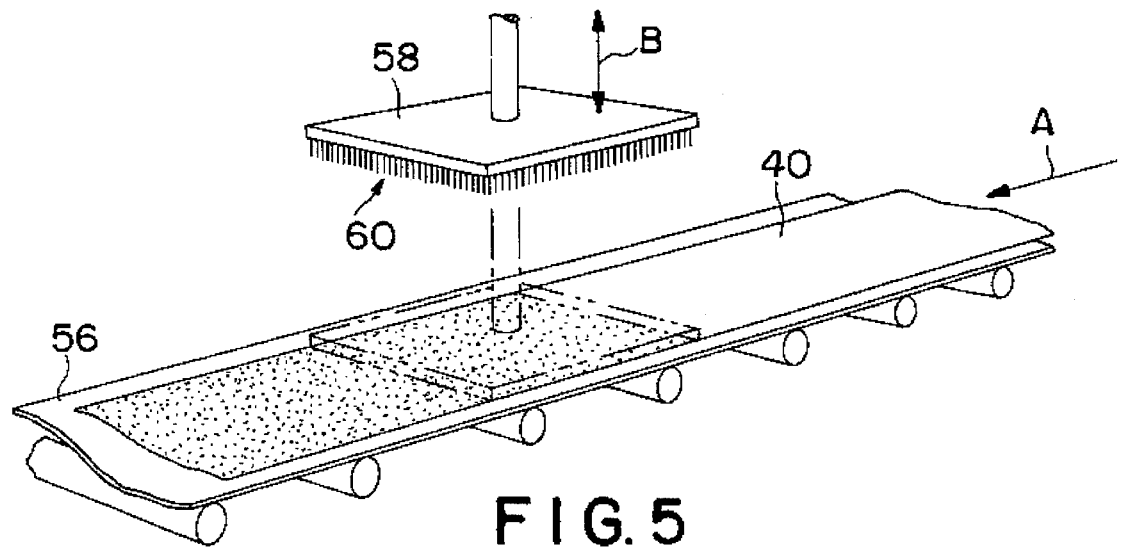
FIG. 5 diagrammatically illustrates needling of a calendered uncoated fabric to selectively increase the porosity thereof.

After the reference permeability is achieved, further processing is utilized to raise the overall permeability of the fabric to a desired level. FIG. 5 illustrates one presently preferred method which may be utilized for this purpose. As shown, fabric 40 is moving in the direction of arrow A under the influence of an appropriate conveyor mechanism 56. A needle carrier 58 having thereon a plurality of needles (referenced generally as 60) is shown reciprocating into and out of engagement with fabric 40, as indicated by arrow B. Preferably, needles 60, which may generally have a size of 18 gauge to 40 gauge, will engage the calendered side of fabric 40.

The density of needles 60 (in number of needles per unit area), along with the speed of fabric 40 and the rate of reciprocation of carrier 58 (as measured in strokes per minute (SPM)) gives a characteristic number of punctures per square inch (PPSI). It has been found that, for a particular needle size operating under defined conditions, a PPSI value may be selected to achieve a desired permeability with greater consistency than has generally been achieved by relying only upon processing parameters as has been the case in the past. In fact, it has been found that a particular air permeability may be achieved according to the invention with a variation of less than approximately +/− 1.0 CFM, as opposed to the +/− 3.0 CFM as was common in the prior art.

Figure 6A:
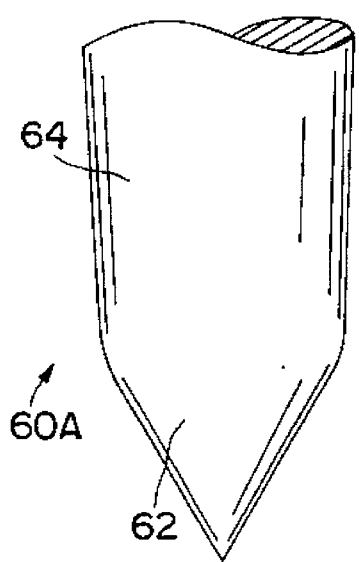
FIGS. 6A and 6B respectively illustrate a barbless needle and a barbed needle such as may be used in the needling apparatus of FIG. 5.

When relatively low levels of permeability are desired, needles 60 are preferably barbless needles, such as needle 60A of FIG. 6A. As shown, needle 60A includes a conical tip portion 62 integrally extending into a tapered shaft portion 64. Because of the shape of tapered shaft portion 64, greater permeability may often be produced at a given PPSI level by increasing the depth of needle penetration.

With barbless needles, it has been found that upon achieving a certain threshold permeability, further needling becomes largely ineffective to provide additional increases in permeability. Generally, this threshold permeability will fall within a range of 3.0 CFM to 4.0 CFM, with a value of approximately 3.5 CFM being typical.

Figure 6B:
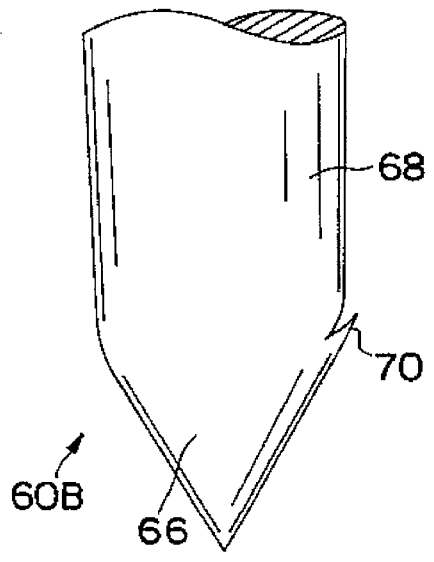

If it is desired that the permeability of fabric 40 be greater than this threshold permeability, a barbed needle, such as needle 60B of FIG. 6B, may be utilized. Like needle 60A, needle 60B includes a generally conical tip portion 66 integrally extending into a tapered shaft portion 68. However, needle 60B further includes at least one barbed portion 70 which functions to enlarge the size of the puncture created when fabric 40 is engaged. It should be appreciated that, while a barbed needle could be utilized to produce permeabilities below the threshold permeability, such is often not desired. This is because the use of a barbed needle creates a rougher fabric surface, which may not be desirable in panels (such as front panel 24 of air bag 20 and body panel 30 of air bag 28) which may come into contact with the face of a vehicle occupant.

Figure 7:
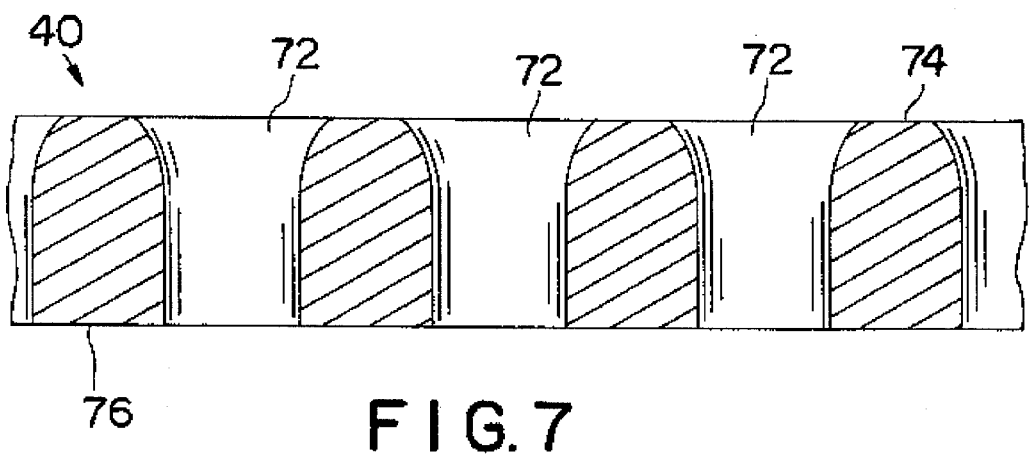
FIG. 7 diagrammatically illustrates a cross section of a calendered uncoated fabric which has been needled to show the configuration of the respective punctures.

FIG. 7 diagrammatically illustrates a plurality of punctures 72 which may be produced in fabric 40 by needling as described. As shown, the conical configuration of needles 60 produces punctures 72 which have a greater diameter at a first side 74 of fabric 40 than at a second side 76 of fabric 40. This generally produces a more laminar flow as gas moves through punctures 72 from side 74 to side 76 than vice versa. As a result, the permeability of fabric 40 is generally greater when side 74 is situated on an interior of the air bag. Thus, to provide a lower permeability in front of the occupant's face, front panel 24 of air bag 20 and body panel 30 of air bag 28 are configured having first side 74 on the exterior. Further smoothness is provided to the occupant's face by the fact that side 74 is also preferably the side which has been calendered. Other areas of air bags 20 and 28 are preferably constructed having first side 74 on the interior to enhance permeability.

Figure 8:
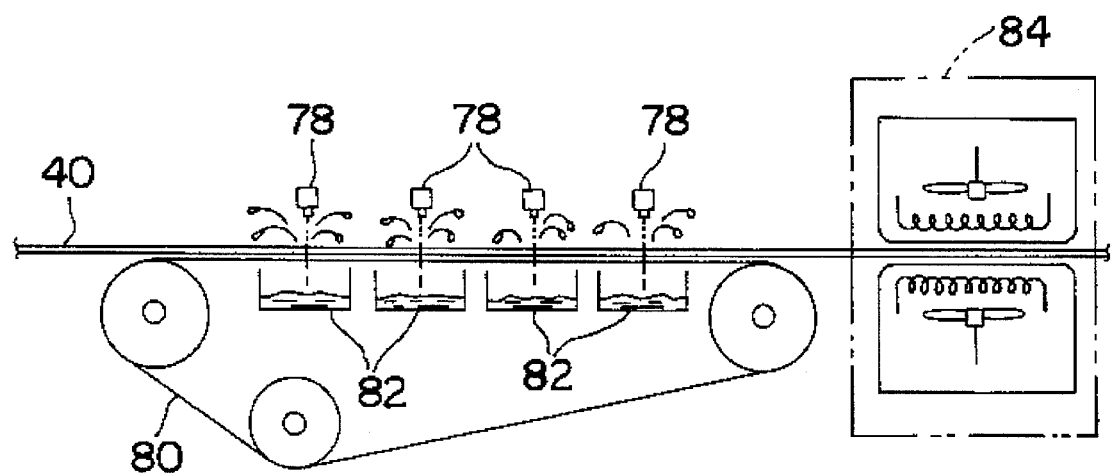
FIG. 8 diagrammatically illustrates a water jet apparatus which may alternatively be used to increase the porosity of the uncoated fabric.

An alternative methodology of producing a controlled permeability in fabric 40 is illustrated in FIG. 8. In this case, fabric 40 is shown moving beneath a plurality of fluid jet headers 78 under the influence of an appropriate conveyor mechanism 80. Each of headers 78 emits a plurality of fluid jets, which strike fabric 40 with predetermined operating characteristics. As a result, pores are created to allow the fluid to flow therethrough.

Several factors will affect the permeability of fabric 40 produced in a fluid jet system, such as that illustrated. In addition to total fluid energy delivered, such factors include the number of orifices in each of headers 78, as well as the spacing and size of these orifices. Generally, conveyor 80 will include a wire mesh substrate which fabric 40 will have a tendency to mimic as it is impacted by the fluid jets. Thus, the type of substrate will also affect the permeability, as well as whether the fluid jet system is flat as illustrated or a rotary type system. In order to permit lower jet energies to form these pores, fabric 40 is preferably uncalendered when this method is utilized.

Preferably, the fluid jets emitted by header 78 are water jets. This water is shown being collected in respective collection basins 82 from which it is carried away. It can be seen that the system of FIG. 8 is similar to a "hydroentanglement" system of the type utilized to produce nonwoven materials. Some of the principals of a hydroentanglement apparatus are described in U.S. Pat. No. 3,494,821, issued Feb. 10, 1972 to Evans, which is incorporated herein by reference.

Generally, nonwoven material produced in a hydroentanglement apparatus is subjected to a relatively strong vacuum to remove absorbed water. However, when used with a woven fabric, such as fabric 40, a vacuum treatment of this type will generally tend to make fabric 40 have a relatively stiff "hand." To retain a relatively "soft" hand, fabric 40 is preferably dried in a tenter oven 84. Oven drying in this manner may also serve to heat set the pores formed by the fluid jets. As a result, such pores will remain in fabric 40 to give the desired air permeability level. In this regard it is desirable that, once dry, that fabric 40 remain heated to a temperature of approximately 350 degrees Fahrenheit to 380 degrees Fahrenheit for a period exceeding approximately 20 to 30 seconds.

It can thus be seen that the invention provides an improved technology for constructing an air bag substantially entirely of uncoated material while achieving a more consistent permeability than was generally achievable with the prior art. While presently preferred embodiments of the invention and presently preferred methods of practicing the same have been shown and described, it should be understood that various modifications and variations may be made thereto by those of ordinary skill in the art. In addition, it should be understood that aspects of the various embodiments may be interchanged both in whole or in part. Furthermore, those of ordinary skill in the art will appreciate that the foregoing description is by way of example only and it is not intended to be limitative of the spirit and scope of the invention so further set forth in the following claims.

What is claimed is:

1. A vehicle air bag for use with an on-board inflator mechanism, said vehicle air bag comprising:

a first panel of calendered uncoated fabric having a permeability of less than approximately 2 CFM at a pressure drop of 0.5 inches of water; and at least one second panel of calendered uncoated fabric of a same yarn and weave type as said first panel operatively associated with said first panel, said at least one second panel having a permeability of greater than approximately 2 CFM at a pressure drop of 0.5 inches of water, at least one of said panels being constructed of a fabric having been processed to a controlled higher permeability subsequent to calendering.

2. A vehicle air bag as set forth in claim 1, wherein at least one of said panels is characterized by a multiplicity of needle punctures therein.

3. A vehicle air bag as set forth in claim 2, wherein respective of said multiplicity of needle punctures generally have a larger diameter at a first side of the calendered uncoated fabric than at a second side of the calendered uncoated fabric.

4. A vehicle air bag as set forth in claim 3, wherein both said first and second panels include said needle punctures therein and wherein said calendered uncoated fabric of said first panel is arranged such that said first side defines a portion of an exterior of said air bag and said calendered uncoated fabric of said at least one second panel is arranged such that said first side defines a portion of an interior of said air bag.

5. A vehicle air bag as set forth in claim 1, wherein said air bag is a driver's side air bag such that said first panel is a front panel and said second panel is a back panel thereof, said back panel being substantially continuous excepting a hole defined therein for providing fluid communication with an on-board inflator mechanism.

6. A vehicle air bag as set forth in claim 5, wherein said back panel has a permeability of at least approximately 4 CFM at a pressure drop of 0.5 inches of water.

7. A vehicle air bag as set forth in claim 5, wherein said back panel has a permeability falling within a range of approximately 4 CFM to 6 CFM at a pressure drop of 0.5 inches of water.

8. A vehicle air bag as set forth in claim 1, wherein said air bag is a passenger side air bag having at least two of said second panels forming respective of a pair of side panels thereof, said side panels each having a permeability of at least approximately 5 CFM at a pressure drop of 0.5 inches of water.

9. A vehicle air bag as set forth in claim 8, wherein said pair of side panels respectively have a permeability falling within a range of approximately 5 CFM to 7 CFM at a pressure drop of 0.5 inches of water pressure.

10. A vehicle air bag for use with an on-board inflator mechanism, said vehicle air bag comprising:
- a first panel of calendered uncoated fabric having a permeability of less than approximately 2 CFM at a pressure drop of 0.5 inches of water; and
- at least one second panel of calendered uncoated fabric operatively associated with said first panel, said at least one second panel having a permeability of greater than approximately 2 CFM at a pressure drop of 0.5 inches of water, wherein at least one of said first and second panels is characterized by a multiplicity of needle punctures therein.

11. A vehicle air bag as set forth in claim 10, wherein respective of said multiplicity of needle punctures generally have a larger diameter at a first side of the calendered uncoated fabric than at a second side of the calendered uncoated fabric.

12. A vehicle air bag as set forth in claim 11, wherein both said first and second panels include said needle punctures therein and wherein said calendered uncoated fabric of said first panel is arranged such that said first side defines a portion of an exterior of said air bag and said calendered uncoated fabric of said second panel is arranged such that said first side defines a portion of an interior of said air bag.

* * * * *